Jan. 10, 1928.
S. DILLER
1,655,598
BATTERY TERMINAL CONNECTER
Filed Oct. 18, 1926
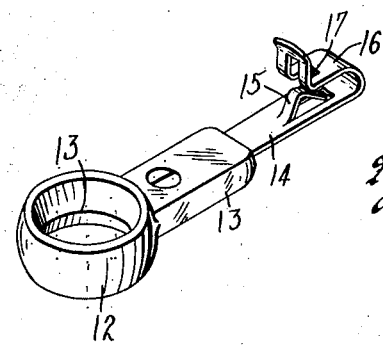
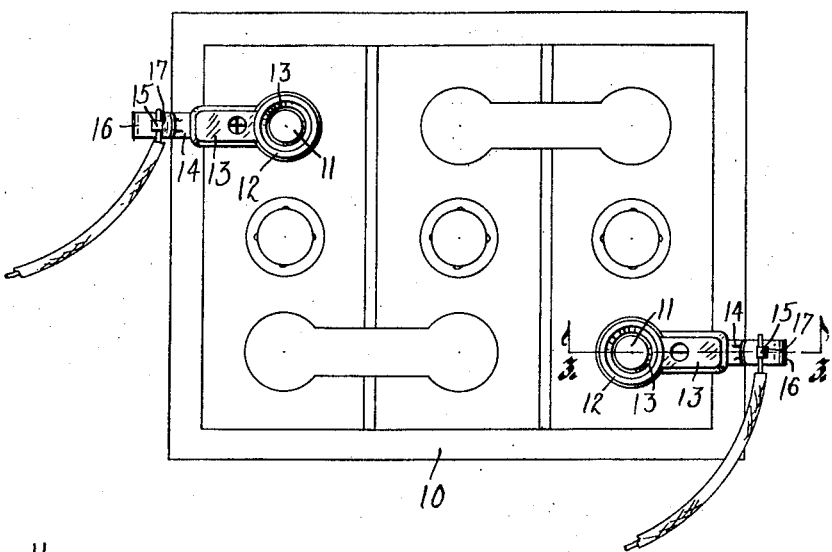
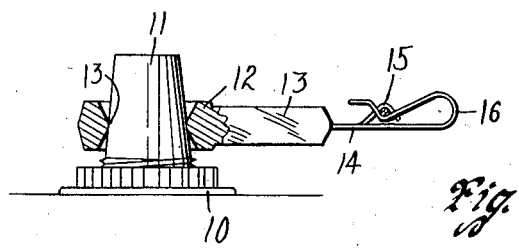
Witness
L. F. Sandberg
Inventor
Sam Diller
by Bair & Freeman Attorneys Patented Jan. 10, 1928.

1,655,598

UNITED STATES PATENT OFFICE.

SAM DILLER, OF DES MOINES, IOWA.

BATTERY TERMINAL CONNECTER.

Application filed October 18, 1926. Serial No. 142,366.

The object of my invention is to provide a battery terminal connecter of very simple, durable and inexpensive construction.

More particularly, it is my object to provide a battery terminal connecter which is adapted for a considerable variety of uses, but is particularly designed for use in connection with the A batteries of radio receiving sets and the like, where it is necessary to frequently install and remove the connecter.

It is my purpose in this connection to provide a battery terminal connecter having an annular member provided with an internal, central rib, the faces of which are inclined away from the center or apex of the rib in both directions for facilitating the easy installation and removal of the connecter.

With these and other objects in view, my invention consists in the construction, arrangement and combination of the various parts of my battery terminal connecter, whereby the objects contemplated are attained, as hereinafter more fully set forth, pointed out in my claim, and illustrated in the accompanying drawings, in which:

Figure 1 is a perspective view of a battery terminal connecter embodying my invention.

Figure 2 is a top view of a battery equipped with terminal connecters embodying my invention; and Figure 3 is a detail, sectional view taken on the line 3—3 of Figure 2.

It is a well known fact that the installation and removal of battery terminal connecters involve a good many problems and difficulties.

Quite frequently the connecters are burned on and the work is done only in the factory or in battery repair shops.

With the extensive use of batteries for radio receiving sets and the like, a problem has arisen as result of the fact that the batteries are frequently recharged, and the user removes the terminal connection before he takes the battery to the shop for recharging. This would make it desirable to provide a battery terminal connecter, which can be conveniently and easily installed or removed by men who are not experts.

It is also desirable that a battery terminal connecter be provided for such purposes, which can be readily removed in the home without use of tools instead of in the shop, if the wire connecting means should become rusted or corroded to the breaking point.

I have therefore provided a battery terminal connecter which will solve the problems just mentioned.

In the accompanying drawings, I have shown a battery indicated by the reference numeral 10 having the terminal posts 11, which are tapered and have the form of truncated cones.

It is known that the posts 11 are of relatively soft metal.

My improved battery terminal connecter comprises an annular ring 12 likewise of relatively soft metal, having an interior, central rib 13, which has faces inclined outwardly in both directions from its center or apex.

Extending away from the ring 12 is a bar or block 13 to which is connected a wire fastener 14 of preferably resilient metal.

This may be of the type having the tongue hook 15 and the spring and member 16 provided with the slot 17 to receive the hook.

A device of this kind is of extremely inexpensive construction and is peculiarly effective for the purpose for which it is designed. The ring 12 is placed over the post 11 and pushed downwardly until the rib 13 snugly grips the post.

An important feature of the structure of this ring is the rib 13 with its faces inclined away from the central portion in both directions.

The parts are so constructed and arranged that the faces of the ribs 13 are inclined away from the wall or surface of the post 11, so that the ring engages the post only at the central portion of the rib, where it is of the smallest diameter, giving a good electrical contact.

Where a ring is made with an opening having the same taper as the post and is forced downwardly over the post, it "freezes" to the post and is difficult to remove. Corrosion and chemical action almost always occur where the terminal connecter is mounted on the post and where the hole in the ring has the same tapering post and parts become corroded, it is necessary to take the battery to a shop to remove the ring.

I find that where the face of the rib is inclined away from the post in both directions, it is possible to readily remove the terminal connecter under practically all conditions, whereas if either of the faces of the rib is made to fit the post snugly, it is much more difficult to remove the connecter.

The ring 12 must be of soft material in order to grip the post and should have the arm 13, so that the wire connection is spaced from the post, so as not to be effected by chemical action. The wire connecter can be of any suitable form for embodying any fastening means suitable for the purpose.

Heretofore, no one, so far as I am aware, has been able to make and use a non-corrosive metal such as lead, for a quickly removable terminal connecter. Non-corrosive lead terminal connecters have always been burned on and never were of a shape and structure to allow quick installation, proper contact and quick removability. I use a non-corrosive somewhat soft, lead connecter, which can be installed and removed without tools and will give a first class connection.

It is obvious that some changes may be made in the details of the structure, but the shape of the rib 13 should be such as to cause it to engage the post only at its apex or part of smallest diameter.

I claim as my invention:

In a device of the class described, the combination of a tapered battery terminal post with a terminal connecter comprising a ring with a central, internal rib engaging the post and having faces inclined away from the post above and below the rib, an arm on said ring, and a wire fastener supported by said arm.

SAM DILLER.